March 16, 1926.
G. W. BEULKE
1,576,710
LIVE ROLLER CONVEYER
Filed Dec. 11, 1922
2 Sheets-Sheet 1
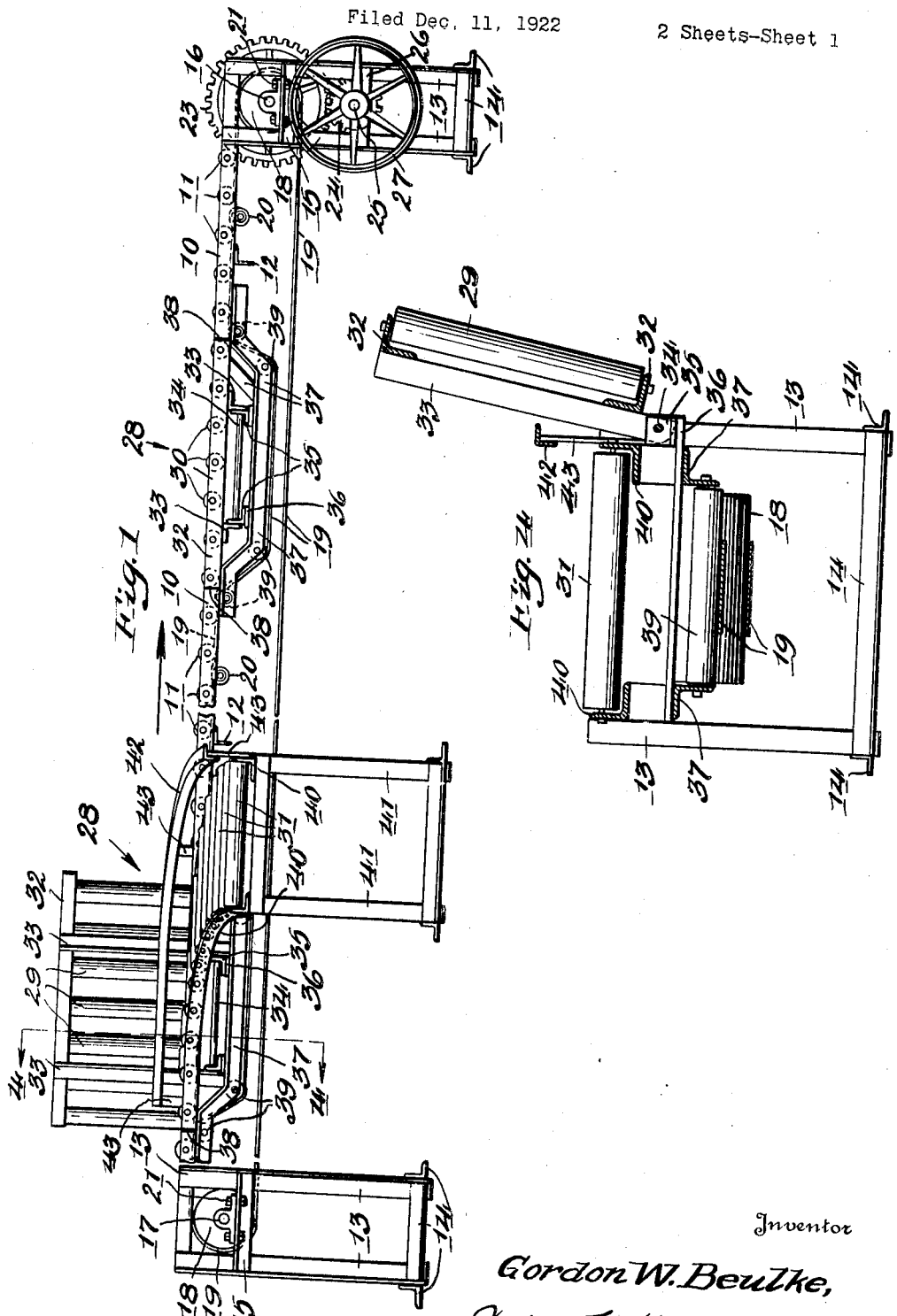
Inventor
Gordon W. Beulke,
By John E. Stryker
his Attorney March 16, 1926.
G. W. BEULKE
1,576,710
LIVE ROLLER CONVEYER
Filed Dec. 11, 1922   2 Sheets-Sheet 2
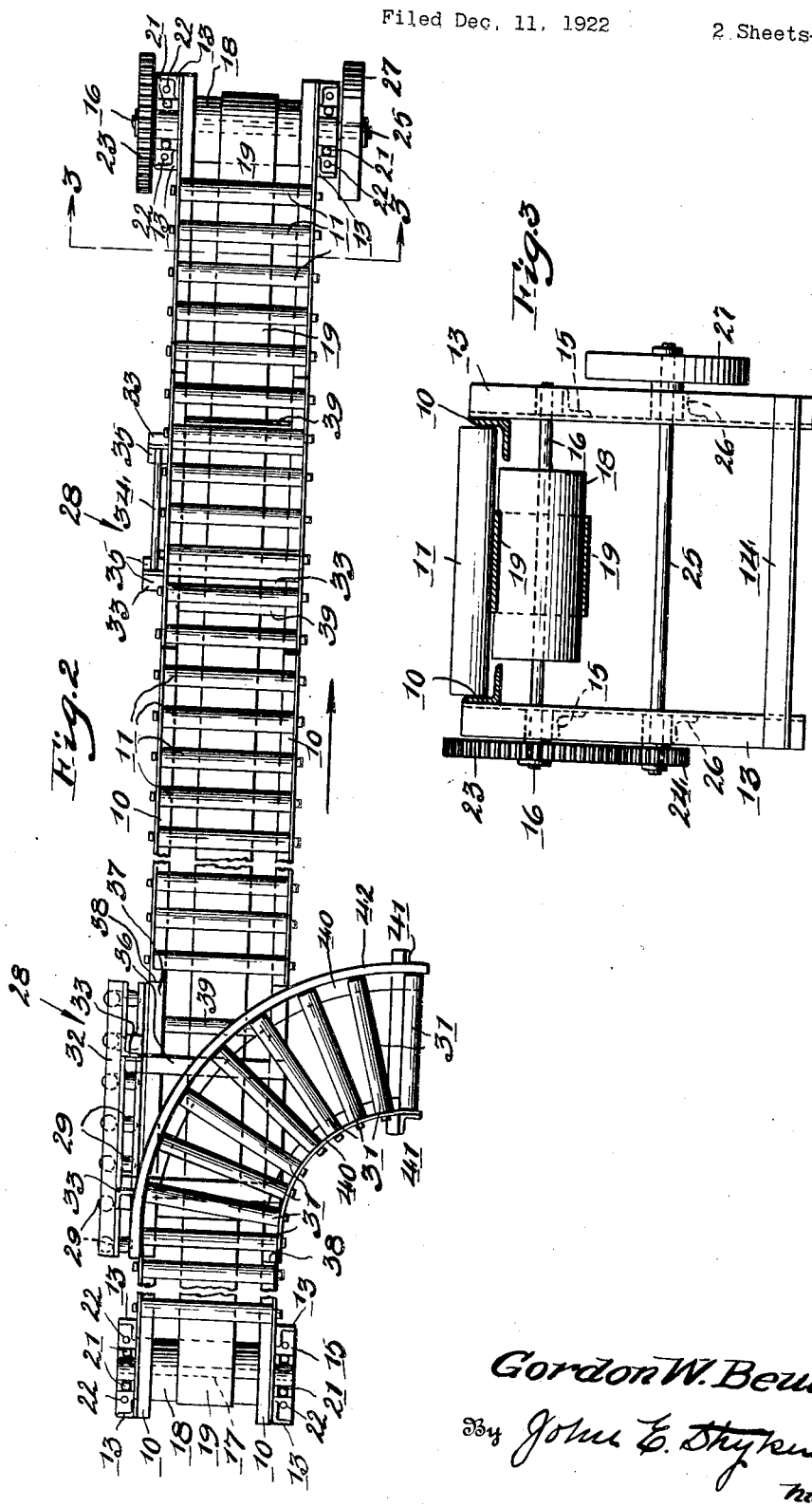

Patented Mar. 16, 1926.

1,576,710

UNITED STATES PATENT OFFICE.

GORDON W. BEULKE, OF ST. PAUL, MINNESOTA, ASSIGNOR TO STANDARD CONVEYOR COMPANY, A CORPORATION OF MINNESOTA.

LIVE-ROLLER CONVEYER.

Application filed December 11, 1922. Serial No. 606,028.

*To all whom it may concern:*

Be it known that I, GORDON W. BEULKE, a citizen of the United States, residing at St. Paul, in the county of Ramsey and State of Minnesota, have invented new and useful Improvements in Live-Roller Conveyers, of which the following is a specification.

It is my object to provide a novel, simple and durable conveyer of the type wherein power is applied to rollers which engage and transport the merchandise.

A further object of my invention is to provide novel means for rotating conveyer rollers.

Another object of my invention is to provide in a conveyer of this kind novel means for diverting packages from a main conveyer line to auxiliary or branch conveyers.

Other objects of my invention will appear and be more fully pointed out in the following specification and claims.

Referring to the accompanying drawings, which illustrate the best form of my device at present known to me, Figure 1 is a side elevation of my improved conveyer, a diverter being shown in position to remove packages from the main conveyer; Fig. 2 is a plan view of the same; Fig. 3 is a section taken on the line 3—3 of Fig. 2, and Fig. 4 is a section taken on the line 4—4 of Fig. 1.

Referring to the drawings I have used the numeral 10 to indicate the side rails of a main conveyer line. A plurality of rollers 11 are supported on the rails 10, the upper peripheries of said rollers being arranged in substantially the same plane so as to form a path upon which packages are carried. The rails 10 are made of angle irons which are connected at suitable intervals by transverse braces 12 and supported upon a plurality of pairs of legs 13, said legs being reinforced near their base by angle bars 14. Secured to the outer surfaces of each pair of the legs 13 are supports 15 for parallel shafts 16 and 17. The latter shafts are journalled in suitable bearings mounted on the upper surfaces of the supports 15. Fast on the shafts 16 and 17 is a pair of drums 18 which carry an endless belt 19. The drums 18, which extend parallel to the rollers 11, are positioned with their upper peripheries in substantially the same plane with the lower peripheries of the rollers 11 so that the upper run of the belt 19 extends beneath and is in contact with the rollers 11. A plurality of guide rollers 20, mounted on the lower surfaces of the rails 10, are positioned at suitable intervals thereon to hold the upper surface of the belt 19 in frictional engagement with the rollers 11. The proper tension in the belt 19 is maintained by a suitable adjustment of bolts 21 in a series of perforations 22 in the supports 15. These bolts 21, as clearly shown in Figs. 1 and 2, fasten the bearings for the shafts 16 and 17 to the supports 15.

The belt 19 is adapted to be moved around the drums 18 by a gear 23, which is fast on the shaft 16, and mounted so as to mesh with a pinion 24 on a counter-shaft 25. This latter shaft is journalled in suitable bearings supported on angle bars 26 and is adapted to be rotated by power applied to a pulley 27.

Means are provided for removing packages from the rollers 11 at stations 28, located at any convenient position on the conveyer. These stations consist of sections of rollers 29 and 30, which are removable from the path of packages on the rollers 11, and a gravity conveyer or diverter section 31 is adapted to replace either of the sections 29 or 30. For convenience in removing the sections 29 and 30 from the main conveyer line these sections are hinged at one lateral edge upon rods 34. The rollers of the sections 29 and 30 are journalled in longitudinal angle bars 32 which are connected by a pair of transverse angle bars 33. One end of each of the latter bars extends beyond the adjacent bar 32 and is perforated to receive the rod 34. This rod is supported by angle clips 35 which are secured to the upper surfaces of flat, transverse bars 36. Off-set rails 37 are fastened to the lower surfaces of the rails 10 so as to connect the ends of said rails where they are cut away at 38 to receive the removable sections 29 and 30. These rails 37, which support the bar 36 also form a support for the sections 29 and 30 when the angle bars 32 are placed in prolongation of the rails 10 and further carry one end of the gravity section 31 when said section is substituted for the sections 29 and 30. The upper run of the belt 19 is directed downward away from the rollers 29 and 30 beneath each of the diverter stations 28 by a series of guide rollers 39 (Figs. 1 and 4) which are mounted between the rails 37.

The rollers of the diverter section 31 are mounted between curved side rails 40 which are supported at one end upon legs 41; and arranged at the other end to be placed in continuation of the rails 10. Standards 43 are mounted upon the outer rail 40 of the curved section 31 and bear upon their upper ends guide rails 42.

When diverter stations 28 are employed the side rails 10 must be mounted in substantially horizontal position so that merchandise or packages of suitable conformation may be carried over the idler rollers of the diverter stations 28 by momentum imparted by the live rollers 11, but where no such stations are required the side rails may be arranged on an incline to facilitate the movement of packages from a lower to a higher level. In either of these arrangements the rollers 11 are rotated by the belt 19 to propel the merchandise or packages in the direction indicated by arrows in Figs. 1 and 2.

The sections 29 and 30 are placed at intervals in the main conveyer line wherever it is desirable to divert packages to another line of conveyer or to a place of storage. At any such diverter station a section 31 is substituted for the removable section 29 or 30. Thus, as shown in Figs. 1 and 4, the section 29 may be removed from the main conveyer line by tilting said section on the rod 32. The section 31 is now placed in position to receive merchandise from the main conveyer, one end of the section 31 being supported on the off-set rails 37. Packages on the main conveyer, guided by the rail 42, will now be delivered to the diverter section 31 and will be carried by gravity to the place of storage or use. The guide 42 will properly direct packages on the section 31.

Having described my invention what I claim as new and desire to protect by Letters Patent is:

1. In a power conveyer, pairs of side rails arranged in separate sections, a plurality of rollers disposed between said rails to form carrier surfaces, means for rotating said rollers, a removable section of rollers joining said sections to form a continuous path for merchandise, and a diverter adapted to be substituted for said removable section.

2. A power conveyer comprising, pairs of side rails arranged in spaced sections, a plurality of rollers disposed between said rails to form carrier surfaces, a broad, endless belt extending beneath the rollers of the several sections and arranged to frictionally engage the lower peripheries of said rollers, a removable section of rollers joining said sections to form a continuous path for merchandise, means for offsetting said belt from the rollers of said removable section, and a diverter section adapted to replace said removable section.

In testimony whereof, I have hereunto signed my name to this specification.

GORDON W. BEULKE.